US007200791B2

(12) United States Patent
Wang

(10) Patent No.: US 7,200,791 B2
(45) Date of Patent: Apr. 3, 2007

(54) METHOD AND TRANSCEIVING DEVICE FOR RETRANSMITTING ERRONEOUS INFORMATION UNITS IN RADIO LINKS

(75) Inventor: Yan Wang, Beijing (CN)

(73) Assignee: Nokia Corporation, Espoo (FI)

( * ) Notice: Subject to any disclaimer, the term of this patent is extended or adjusted under 35 U.S.C. 154(b) by 400 days.

(21) Appl. No.: 10/483,527

(22) PCT Filed: Jul. 10, 2001

(86) PCT No.: PCT/EP01/07940

§ 371 (c)(1),
(2), (4) Date: Jul. 7, 2004

(87) PCT Pub. No.: WO03/007534

PCT Pub. Date: Jan. 23, 2003

(65) Prior Publication Data

US 2004/0243901 A1    Dec. 2, 2004

(51) Int. Cl.
*H04L 1/18*    (2006.01)
(52) U.S. Cl. .................................. 714/751; 714/748
(58) Field of Classification Search ................ 714/748, 714/751
See application file for complete search history.

(56) References Cited

U.S. PATENT DOCUMENTS 4,701,923 A    10/1987    Fukasawa et al.

FOREIGN PATENT DOCUMENTS

| EP | 1 073 228 | 1/2001 |
| WO | WO 00/27064 | 5/2000 |
| WO | WO 2003007534 A1 * | 1/2003 |

OTHER PUBLICATIONS

P. Decker, "*An Adaptive Type-II Hybrid ARQ/FEC Protocol Suitable for GSM*," Vehicular Technology Conference, 1994 IEEE 44th Stockholm, Sweden, Jun. 8-10, 1994, pp. 330-333.

* cited by examiner

*Primary Examiner*—R. Stephen Dildine
(74) *Attorney, Agent, or Firm*—Alfred A. Fressola; Ware, Fressola, Van Der Sluys & Adolphson LLP

(57) ABSTRACT

The present invention is related to an error handling in transmission of information units in radio links and in particular it is related to an error handling using automatic repeat request (ARQ) and transmission of information units in mobile communication. To reduce the access delay of packet data services, the present invention uses different code ratings according to type II hybrid ARQ for different erroneous information units selected from a formatted block of information units before retransmission. Therefore erroneous information units of a block of information units, that have been transmitted, are selected and the set of selected erroneous information units is divided into a set of n subsets encoded with n code ratings. Advantageously, the retransmission of portions of the formatted block with different code ratings enhances the reliability of the retransmission.

19 Claims, 3 Drawing Sheets

METHOD AND TRANSCEIVING DEVICE FOR RETRANSMITTING ERRONEOUS INFORMATION UNITS IN RADIO LINKS

CROSS REFERENCE TO RELATED APPLICATIONS

This application is for entry into the U.S. national phase under §371 for International Application No. PCT/EP01/07940 having an international filing date of Jul. 10, 2001, and from which priority is claimed under all applicable sections of Title 35 of the U.S. Code including, but not limited to, Sections 120, 363 and 365(c).

TECHNICAL FIELD

The present invention is related to an error handling in transmission of information units in radio links and in particular it is related to an error handling using automatic repeat request (ARQ) and transmission of information units in mobile communication.

BACKGROUND OF THE INVENTION

In mobile communication, transmission is performed by using a digital modulation to impress data on carrier waves. There exists a large variety of standardised air interfaces, such as the Global System for Mobile Communication (GSM) standard specified by the European Telecommunication Standard Institute (ETSI) using time division multiple access (TDMA), while in the U.S. a number of interim standards such as IS-54 and IS-136 are defined.

The growing number of mobile terminal devices such as mobile phones or communicators yields a bigger demand for voice and data channels within the system of mobile communication. The increasing interference between neighbouring base stations and interference with other devices using radio links decreases the carrier to interference (C/I) or carrier to noise (C/N) ratio. Thus, the quality of mobile phone channels is highly fluctuating, so that transmission of erroneous information or information that is being corrupted during transmission is a very common phenomenon. The quota of erroneous units can be as high as 1% up to 10%.

To handle the problem of large error rates, usually a channel coding (convolutional coding can also be used other than block coding) is used to introduce a redundancy to the data stream, which allows for a recognition and a possible correction of erroneous units transmitted. The definition of such a channel coding is known to every person skilled in the art, and thus a more precise discussion is omitted from the following specification. The reliability of the channel coding is defined by the number of data bits per coded bits. The higher the number of data bits per code bits, the less redundancy is introduced to the data stream and the less encoded information unit is secured against corruption during transmission. If an erroneous unit is received, a retransmission of the (in type II hybrid ARQ, the retransmitted data can be not the same as the first transmission) data is necessary. Accordingly, the basic ARQ scheme provides error detection and retransmission capabilities. If an information unit is found to be corrupted during transmission, it is discarded and a retransmission of the same information unit is requested.

On the other hand a fast transmission of data other than voice channels, such as in the general packet radio service (GPRS) standard or in the upcoming universal mobile telecommunication system (UMTS) standard, is essential due to a large amount of transferred data and a limited transmission rate. The transmission rate is determined among other factors by the reliability of the transferred data. The higher the number of coded bits the poorer the transmission rate. Yet, it is important to select from a large number of data bits per coded bits $v$ corresponding to the quality of the transmission link to ensure a fast and reliable transmission.

One commonly used scheme is the type II hybrid ARQ. In the type II hybrid ARQ scheme, information is first sent with high (code rating $\frac{2}{3}$ as "higher" than $\frac{1}{2}$.) code rating, i.e. little redundancy, and if one erroneous unit is requested to be retransmitted, additional code bits will be added for the following transmission. This enhances the efficiency of the transmission. First, a rather poor coding is used and only if transmission fails due to erroneous units, a more reliable block code is used.

For example, two different types of type II hybrid ARQ schemes can be used. A set of consequent code ratings defined by the number of data bits per code bits $v$ increasing as $1 \rightarrow \frac{1}{2} \rightarrow \frac{1}{3}$ is used. Another one is using a finer code rating granularity. This scheme yields a code rating of $v$: $1 \rightarrow \frac{2}{3} \rightarrow \frac{1}{2} \rightarrow \frac{2}{5} \rightarrow \frac{1}{3}$. It is appreciated by a person skilled in the art, that a fine code rating granularity results in a higher link throughput but in higher normalised packet delays as well.

SUMMARY OF THE INVENTION

Therefore, it is the object of the present invention to reduce the access delay of packet data services. According to the present invention, this object is achieved by using different code ratings for different erroneous units selected from a formatted block of information units before retransmission.

Accordingly, a method for retransmitting a formatted block of information units, that have been transmitted in radio links (a main feature of mobile communication systems, such as mobile telecommunication systems for mobile cell phones, satellite communication systems, or radio relay systems) using a first code rating, is provided. It comprises the steps of selecting all erroneous units of the block of information units, that have been transmitted, dividing the selected set of erroneous units into n disjunct subsets, selecting a set of n distinct code ratings, encoding all erroneous units of the i-th subset with one of the distinct code ratings, formatting a block composed of the encoded erroneous units, and transmitting the formatted block. This method has the advantage of retransmitting different portions of the formatted block with different code ratings. Usually, information units are interdependent, and if a first erroneous unit is corrupted during retransmission all consequent erroneous units will still be held in the buffer even if they are received correctly after combination.

In a preferred embodiment, the method of the present invention further comprises a step of interleaving at least two information units while formatting a block of the encoded erroneous units. Interleaving is preferably performed due to a strongly correlated occurrence of bit errors during transmission.

In another preferred embodiment of the present invention, the first code rating is having a first number of data bits per code bits, and the elements of the set of code ratings are having each a number of data bits per coded bits and the first number is greater than each number of data bits per coded bits of the set of code ratings. Thus, the reliability of transmission is increased while retransmitting the erroneous information units. Preferably, the selected set of erroneous units is divided into two disjunct subsets, while one subset consists of a first erroneous unit and the other subset consists of all other erroneous units and advantageously the first subset consisting of a first transmitted erroneous unit is encoded using a code rating having a number of data bits per coded bits greater than a code rating used to modulate the second subset.

Normally, if the unit of a first code rating is received with error, another, lower code rating will be used for retransmission. In the preferred embodiment present invention, all units are encoded by a first code rating. If a set of units is received with error, the first unit will be retransmitted with a lower code rating. All other erroneous units will be encode by a code rating lower than the original code rating, yet not as reliable as the code rating of the first erroneous unit, so as to allow for an average delay less than in the type II hybrid ARQ scheme known in the prior art. If errors persist after retransmission, the remaining erroneous units will be retransmitted with a refined corresponding code rating.

Yet, according to another preferred embodiment of the present invention, the erroneous units are divided into subsets, such that every subset contains one single erroneous unit. Preferably, the subsets are ordered according to a timely sequence of their transmission. Advantageously, the set of code rating is ordered according to the values of each number of data bits per coded bits. Like in the above mentioned embodiment, not all erroneous units are retransmitted using a more reliable code rating. The reliability of transmission is adapted to the sequence of the erroneous units, since earlier transmitted units may cause subsequent units to be hold in buffer.

According to another aspect of the present invention, a computer program product is provided, comprising program code means stored on a computer readable medium for performing the method for retransmitting erroneous information units using a type II ARQ scheme. By using a computer program for the execution of the method for retransmitting erroneous information units using a type II ARQ scheme, the method can easily be implemented in a computer or terminal device.

According to yet another aspect of the present invention, a computer program product is provided, comprising program code means stored on a computer readable medium for performing any of the above-described methods when the program product is run on a computer or terminal device.

According to still another aspect of the present invention, a transceiving device is provided, comprising means for transceiving information units, means for selecting erroneous units, that have been corrupted during transmission, means for requesting a retransmission of the erroneous units, means for receiving a retransmission request, means for selectively modulating erroneous units using a set of selected code ratings, and means for formatting a block.

Since communication is always going in both directions, a device taking part in communication both transmits as well as it receives formatted blocks of information units. It unravels a formatted block and checks every information unit, if it is received with error or not. Thus it selects all erroneous units that have been corrupted during transmission and can not be corrected by help of the redundancy of a code rating used for encoding or modulation before transmission. If erroneous units are received, a retransmission request is sent, requesting for a retransmission of those units, until no more erroneous units are found. The same device is used on the other hand to transmit information units. Those information units are first encoded by a set of selected code ratings, formatted to a block and then transmitted by the transceiving means. If a retransmission request is received, indicating that a subset of the transmitted information had been received by another transceiving device with error, those erroneous units are selected and encoded anew with a different set of code ratings, selected according to the previously described method, before being formatted to a block and being retransmitted.

The transceiving device may be a terminal device, preferably a mobile terminal device or it may be an access point in mobile communication. Examples for those transceiving devices are mobile phones or base stations in a mobile communication system. Yet, it will be appreciated, that other transceiving devices may be thought of, such as satellites or computers and other devices, linked by wireless connection, such as bluetooth, infrared (IR) or radio relay systems.

According to still yet another aspect of the present invention, a communication network is provided, comprising at least one transceiving device and at least one access point in communication for the transceiving device and forming part of a network. A communication network thus consists of at least two transceiving devices, one being the access point in communication. Preferably, the communication network according the present invention further comprises a server, where the server is coupled to another network, and advantageously, at least one network is a network in mobile communication. The network is preferably the Internet.

BRIEF DESCRIPTION OF THE DRAWINGS

A more complete appreciation of the invention and many other attendant advantages thereof will be readily obtained, as the same becomes better understood by reference to the following detailed description when considered in connection with the accompanying drawings, wherein.

DETAILED DESCRIPTION

Figure 1:
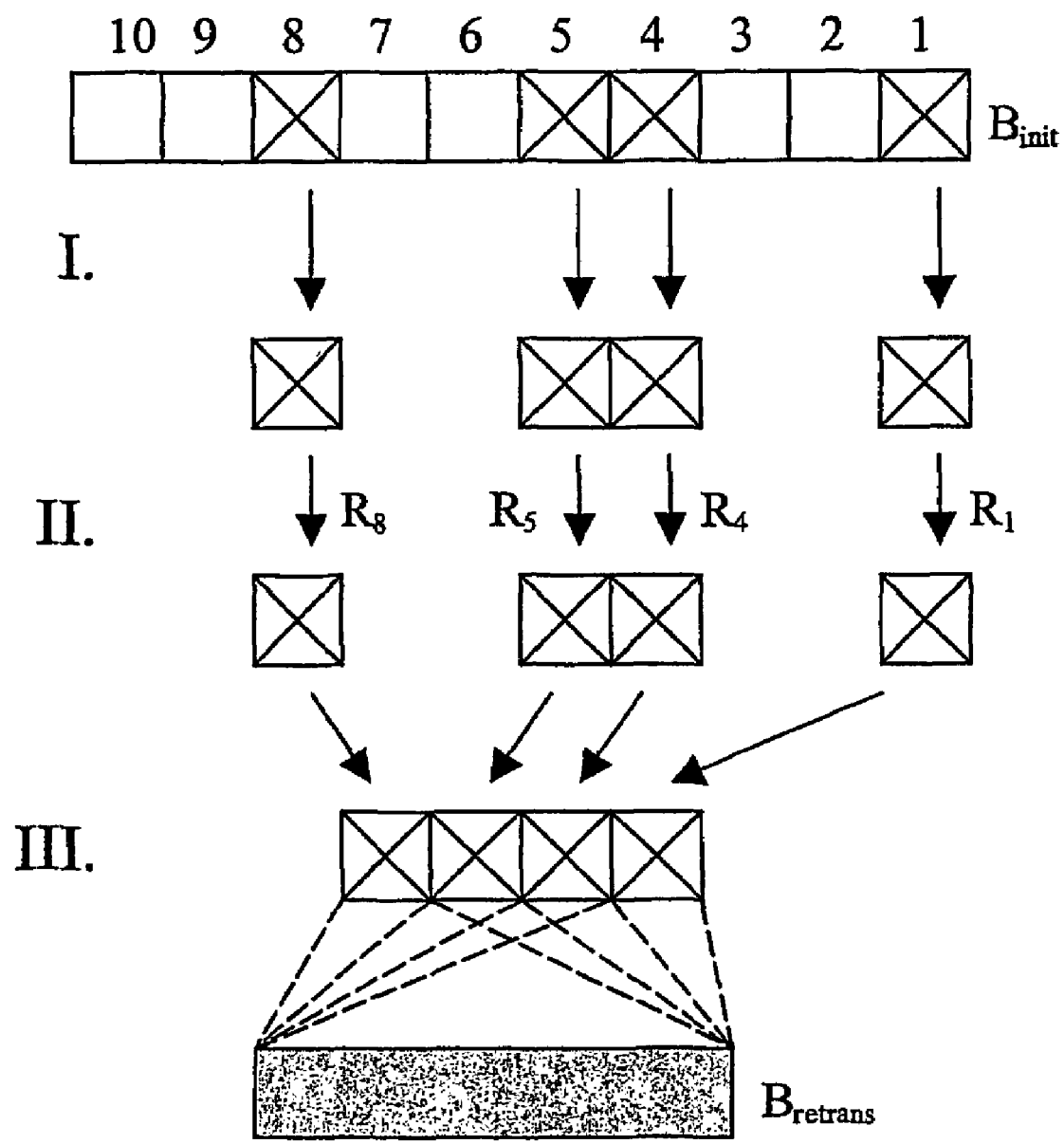
FIG. 1 shows a schematic diagram of the method for retransmitting erroneous information units according to a preferred embodiment of the present invention and FIG. 2 illustrates a communication network exchanging information units by radio link.

As shown in FIG. 1 a formatted block $B_{init}$ of information unit 1, 2, 3, 4, 5, 6, 7, 8, 9, 10 is received, of which four units 1, 4, 5, 8 are identified as being corrupted during transmission and a correction of these not being possible. This erroneous units 1, 4, 5, 8 are selected and in a first step I. a retransmission of these units 1, 4, 5, 8 is requested. The retransmission of the erroneous units 1, 4, 5, 8 is prepared by selecting a set of corresponding code ratings $R_1$, $R_4$, $R_5$, $R_8$ in step II. According to the present invention, these code ratings differ from the code rating of the initial transmission by having less data bits per coded bits, so as to assure a more reliable retransmission. The set of coded bits may consist of code ratings having different numbers of data bits per coded bit. In any case the code rating $R_1$ of the first erroneous units 1 should have the lowest number of data bits per code bits, so as to ensure that the first erroneous unit is retransmitted using the most reliable coding.

According to one preferred embodiment of the present invention, the other code ratings $R_4$, $R_5$, $R_8$ may be all equal concerning the number of data bits per coded bits, thus being of similar reliability. According to another preferred embodiment of the present invention, all code ratings $R_4$, $R_5$, $R_8$ differ from each other, having different numbers of data bits per code bits, so that one code rating is always having less data bits per coded bits, i.e. being more reliable, than all consequent code ratings. Yet it should be noted, that many different choices of the code ratings may be used. In a consequent third step III., all erroneous units 1, 4, 5, 8 are encoded with the corresponding code ratings $R_1$, $R_4$, $R_5$, $R_8$ before being formatted to a block of information units $B_{retrans}$, which preferably may include a step of interleaving the erroneous units 1, 4, 5, 8, so as to handle correlated interference during transmission. The formatted block $B_{retrans}$ is to be retransmitted.

Figure 2:
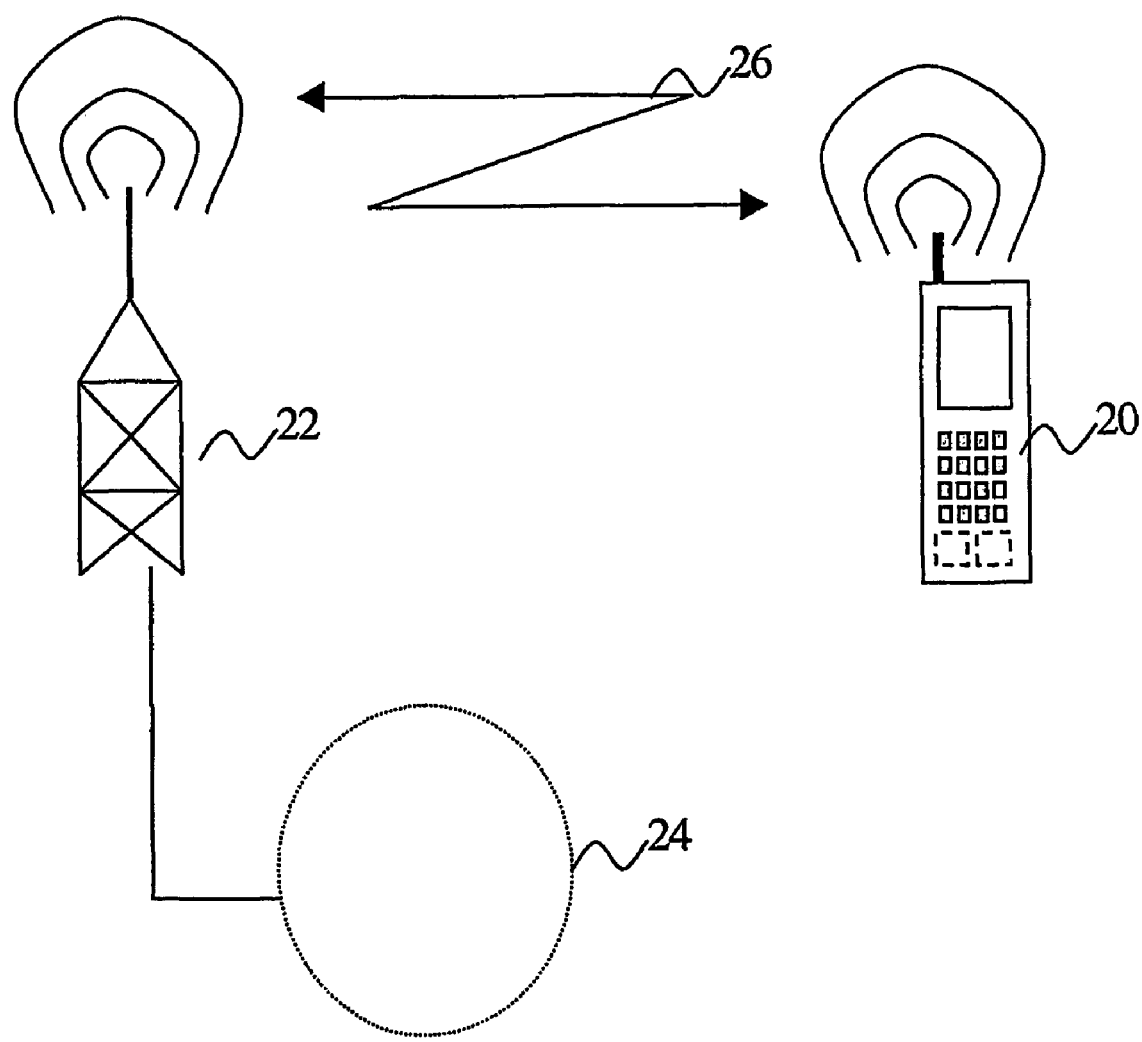

FIG. 2 illustrates a communication network according to a preferred embodiment of the present invention, consisting of a mobile terminal device 20 being in mobile communication with an access point 22 connected to a network 24 by radio link 26. The mobile terminal device 20 and the access point 22 in mobile communication are exchanging formatted blocks of information units, that may be corrupted during transmission by radio link 26. If, for example, the mobile terminal device 20 is receiving a formatted block of information units containing erroneous units it is selecting those units and requesting a retransmission of the erroneous units from the access point 22. The access point 22 is encoding the erroneous units and formatting a block of these encoded erroneous units according to the above described method and retransmitting this block. Retransmission is performed until all information units are received without error, while every retransmission is having a higher reliability than the preceding transmission. Transmission is performed in the same manner, if the mobile terminal device 20 is acting as transmitter and the access point 22 is receiving transmitted data.

Figure 3:
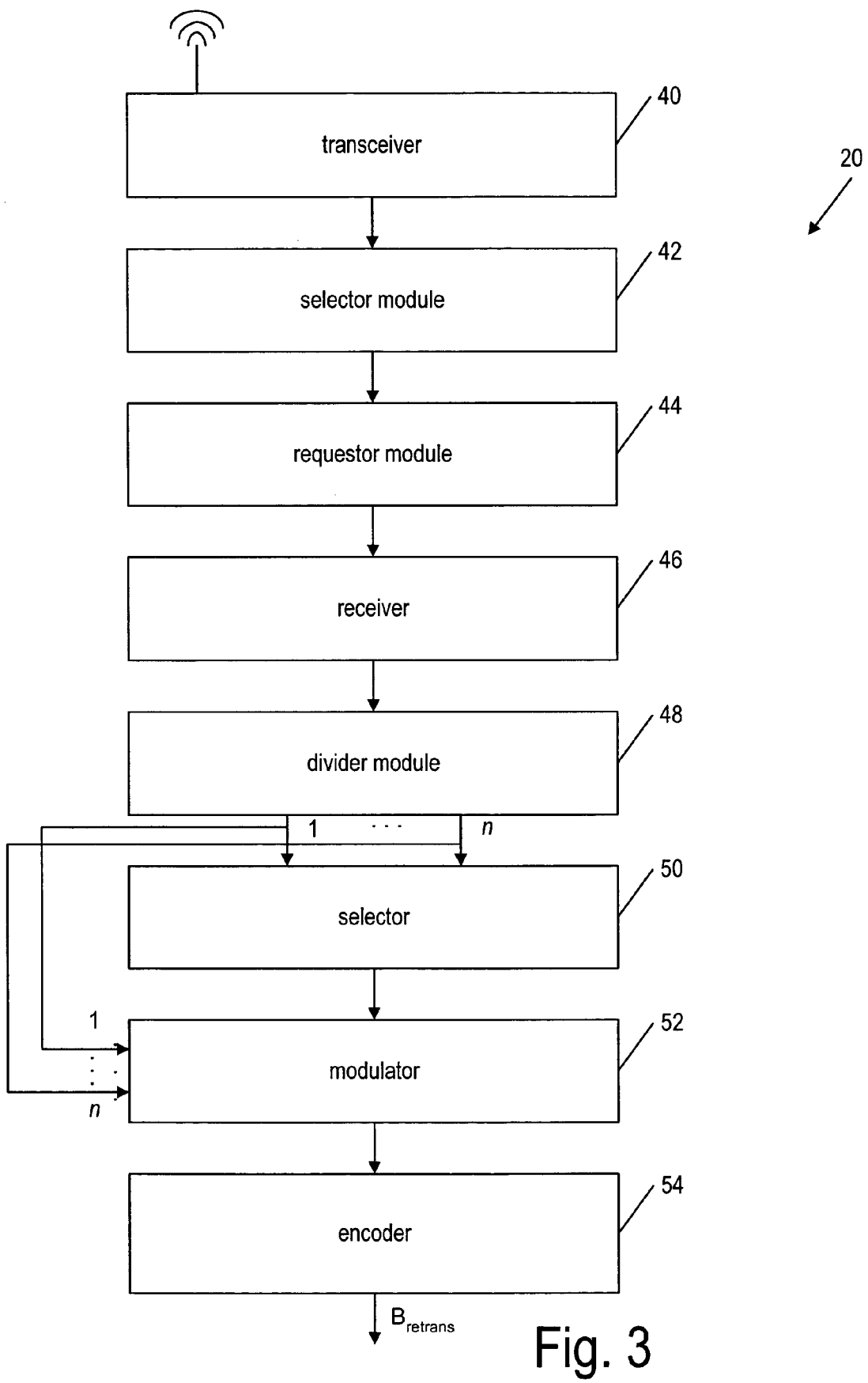
FIG. 3 is a block diagram of a mobile terminal device according to the present invention.

FIG. 3 illustrates such a mobile terminal device 20. As seen there, the device 2 includes a transceiver 40 for receiving and transmitting information units (1–10); a selector module 42 that selects erroneous units (1, 4, 5, 8) that have been corrupted during transmission; and a requestor module 44 that requests retransmission of such erroneous units. The device also includes a receiver 46 that receives a retransmission request; a divider module 48 that divides a selected set of such erroneous units (1, 4, 5, 8) into n distinct subsets of units (n greater than one); and a selector 50 that selects a set of n distinct numbers of data bits per coded bits ($R_1$, $R_4$, $R_5$, $R_8$). The device also has a modulator 52 for selectively modulating all erroneous units of each of the subsets with a different one of the numbers of data bits per coded bits ($R_1$, $R_4$, $R_5$, $R_8$), so that the number of data bits per coded bits of the first erroneous unit is the lowest of the numbers of data bits per coded bits ($R_1$, $R_4$, $R_5$, $R_8$). An encoder 54 then formats a block ($B_{retrans}$) composed of these encoded erroneous bits (1, 4, 5, 8).

This specification contains the description of implementations and embodiments of the present invention with the help of examples. It will be appreciated by a person skilled in the art, that the present invention is not restricted to details of the embodiments presented above, and that the invention can also be implemented in another form without deviating from the characteristics of the invention. The embodiments presented above should be considered as illustrative, but not restricting. Thus, the possibilities of implementing and using the invention are only restricted by the enclosed claims. Consequently, various options of implementing the invention as determined by the claims, including equivalent implementations, also belong to the scope of the invention.

The invention claimed is:

1. A method for retransmitting a formatted block of information units that have been transmitted in radio links using a first number of data bits per coded bits, comprising:
   selecting all erroneous units of said block of information units that have been transmitted;
   dividing said selected set of erroneous units into n disjunct subsets, wherein n is greater than or equal to 2;
   selecting a set of n distinct numbers of data bits per coded bits;
   encoding all erroneous units of each of said subsets with a different one of said numbers of data bits per coded bits, wherein the number of data bits per coded bits of the first erroneous units is the lowest of said numbers of data bits per coded bits;
   formatting a block composed of said encoded erroneous units; and
   transmitting said formatted block.

2. A method according to claim 1, wherein formatting a block of said encoded erroneous units comprises the step of interleaving at least two of said encoded erroneous units.

3. A method according to claim 1, wherein said first number of data bits per coded bits is greater than each number of data bits per coded bits out of said set of numbers of data bits per coded bits.

4. A method according to claim 1, with n equal to 2, wherein one subset consists of a first erroneous unit and the other subset consists of all other erroneous units.

5. A method according to claim 4, wherein said first subset consisting of a first transmitted erroneous unit is encoded using a number of data bits per coded bits which is smaller than the number of data bits per coded bits used to encode said second subset.

6. A method according to claim 3, wherein each of said subsets contains one single erroneous unit.

7. A method according to claim 1, wherein said subsets are ordered according to a timely sequence of their transmission.

8. A method according to claim 1, wherein the set of said numbers of data bits per coded bits is ordered according to the numbers of data bits per coded bits.

9. A computer program product comprising program code means stored on a computer readable medium for carrying out the method of claim 1 when said program product is run on a computer or network device.

10. A computer program product comprising program code, downloadable from a server for carrying out the method of claim 1 when said program product is run on a computer or network device.

11. A transceiving device, comprising:
   a component for transceiving information units;
   a component for selecting erroneous units that have been corrupted during transmission;
   a component for requesting a retransmission of said erroneous unit;
   a component for receiving a retransmission request;
   a component for dividing said selected set of erroneous units into n disjunct subsets, wherein n is greater than or equal to 2;
   a component for selecting a set of n distinct numbers of data bits per coded bits;
   a component for selectively modulating all erroneous units of each of said subsets with a different one of said numbers of data bits per coded bits, wherein the number of data bits per coded bits of the first erroneous unit is the lowest of said numbers of data bits per coded bits; and an encoding component for formatting a block composed of said encoded erroneous units.

12. A transceiving device according to claim 11, wherein said transceiving device is a terminal device.

13. A transceiving device according to claim 12, wherein said transceiving device is a mobile terminal device.

14. A transceiving device according to claim 13, wherein said transceiving device is an access point in mobile communication.

15. A communication network comprising:
at least one transceiving device according to claim 11; and
at least one access point in communication for said transceiving device and forming part of a network.

16. A communication network according to claim 15, further comprising a server, characterised in that said server is coupled to another network.

17. A communication network according to claim 16, wherein at least one network is a network in mobile communication.

18. A communication network according to claim 16, wherein said network is the Internet.

19. A transceiving device, comprising:
means for transceiving information units;
means for selecting erroneous units that have been corrupted during transmission;
means for requesting a retransmission of said erroneous unit;
means for receiving a retransmission request;
means for dividing said selected set of erroneous units into n disjunct subsets, wherein n is greater than or equal to 2;
means for selecting a set of n distinct numbers of data bits per coded bits;
means for selectively modulating all erroneous units of each of said subsets with a different one of said numbers of data bits per coded bits, wherein the number of data bits per coded bits of the first erroneous unit is the lowest of said numbers of data bits per coded bits; and
means for formatting a block composed of said encoded erroneous units.

* * * * *